United States Patent Office 3,533,057
Patented Oct. 6, 1970

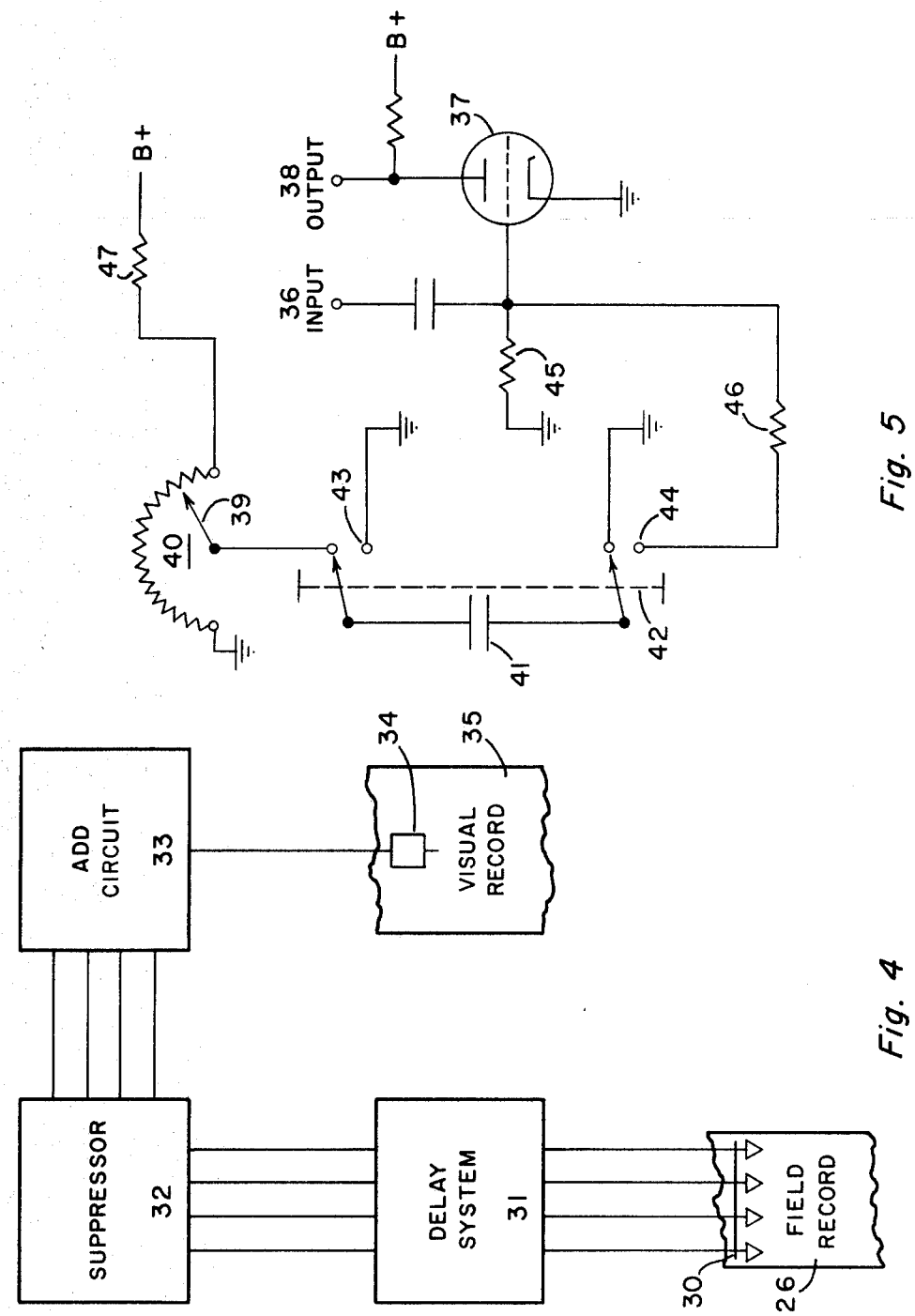

3,533,057
COMMON REFLECTION POINT TECHNIQUES
John P. Woods and Emmet D. Riggs, Dallas, Tex., assignors to Atlantic Richfield Company, Philadelphia, Pa., a corporation of Pennsylvania
Continuation of application Ser. No. 429,038, Jan. 29, 1965. This application July 7, 1967, Ser. No. 651,949
Int. Cl. G01v 1/32, 1/36
U.S. Cl. 340—15.5
7 Claims

ABSTRACT OF THE DISCLOSURE

A process or seismic prospecting whereby a plurality of seismic traces can be combined to give an improved summation trace. The seismic traces are obtained according to the common bounce point method and then are aligned by making moveout corrections. The initial portion of each corrected trace is suppressed for a time duration which progressively increases as the source-to-detector spacing for each trace increases. The residual portions of the several traces are then stacked.

This is a continuation of application Ser. No. 429,038, filed Jan. 29, 1965, now abandoned.

The present invention is generally concerned with improvements in the signal-to-noise ratio in seismic signals. More particularly, the invention relates to techniques for operating on seismic data obtained by the common reflection point method.

Seismic exploration relates to a method of obtaining information regarding subterranean earth formations by transmitting energy from a first point at or near the surface of the earth downwardly into the formations and measuring the reflected and/or refracted energy at one or more second points. According to practice, an explosive charge or other energy source is used to produce the seismic energy. A plurality of seismometers is disposed in a predetermined geometrical array in spaced relationship from the "shot" point. The energy incident upon the seismometers is converted into counter-part electrical signals which are amplified and recorded. By timing the arrivals of selected vibrations, valuable information can be obtained regarding the depth and character of the subterranean earth formations. However, extraneous energy forms are normally present which tend to oscure the recognition of the desired signals.

Improvements in the signal-to-noise ratio of seismic signals has been a continuing project with geophysicists for many years. Various systems have been described which achieve noise attenuation by means of multi-element arrays. As the multiplicity of shot points and detectors is increased, however, the subsurface area which is averaged increases correspondingly. This, of course, tends to obscure the very detail which is being sought.

The multiple coverage, common reflection point technique described in U.S. Pat. 2,732,906 to Mayne was devised to provide a practical means of increasing multiplicity. Mayne proposes that the information associated with a given reflection point, but recorded with a multiplicity of shot point and geophone locations, be combined algebraically after applying appropriate time corrections. Thus, if the reflected signals received along the several paths are adjusted for coincidence, their resultant sum will be proportional to the number of sigals. Perturbations following other than the postulated energy paths will not be coincident, and, hence, will be degraded relative to the reflections of interest. This is analogous to pattern performance. Since, however, the source and receiving points are selected so that seismic energy from each shot point is reflected from the same small subsurface area, the above-discussed limitation inherent with conventional pattern techniques no longer applies. The "common bounce point" method has the further advantage that multiple reflections are attenuated. Also, this technique can be used for conducting land surveys, applied to offshore operations, or used for surveying shallow inland bays, lakes, etc.

Although the common reflection point, data-stacking technique has enhanced signal-to-noise ratios well beyond the practical limits of conventional pattern methods, there is still much room for improvement. The major problem has been that the horizontal spacing, or "spread spacing" between the several shot points and receivers is limited by stepout distances which must be kept small with respect to the reflection period. Since there generally is an area of interest close to the surface, the maximum spacing distance or receiver spread is severely limited. Also, the type and form of energy reflected from the selected bounce points changes in accordance with the angle of reflection. This prevents coincidence adjustment of the requisite accuracy whenever the source-receiver spacing is relatively large.

The present invention involves an improved procedure for carrying out the common bounce point technique which overcomes these difficulties.

Accordingly, it is an object of this invention to provide a method and apparatus for recording and reproducing seismic signals in such a manner as to amplify the desired reflections and minimize random energy.

Another object is to provide a method and apparatus for transforming seismic field records obtained by the common bounce point method so as to eliminate portions of certain traces.

Another object is to provide a system for incorporating step-out corrections in seismic records.

Another object is to provide a method and apparatus for the selective addition of seismic traces so as to more accurately depict the cross-section of the earth under study.

Another object is to provide a system for improving the addition of seismic signals reflected from a common point in a subsurface formation and recorded at multiple horizontally spaced points.

Other objects, advantages, and features of the invention will become apparent from the following detailed description, when taken in conjunction with the accompanying drawings in which:

FIG. 4 is a block diagram presenting the basic apparatus used to practice our invention.

FIG. 5 is a circuit diagram of the novel suppressor unit we devised.

Figure 1:
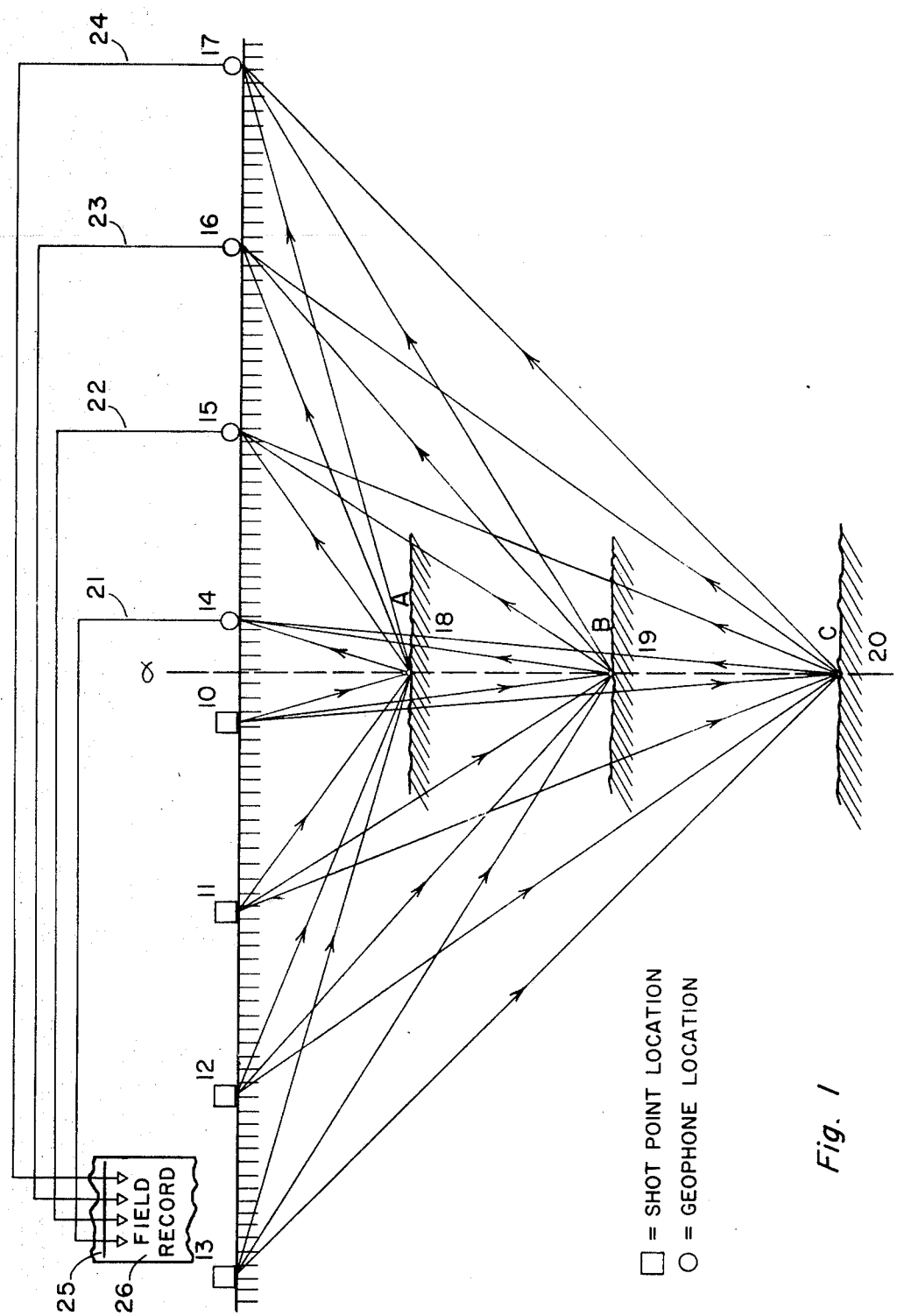
FIG. 1 is a schematic representation of the location of shot points and seismometers according to the common reflection point method.

In order to facilitate an understanding of the invention we will now define certain terms according to their intended usage.

The term "seismic trace" or "seismic channel" is intended to mean seismic information from a particular geophone location impressed on a suitable recording medium. Each trace is, in effect, a record relating time, magnitude, and phase of the seismic energy received. It will be noted at this point that most seismic records are composites of twenty or more trains of signals from as many geophone locations. In turn, each geophone location may consist of a plurality of geophones which are connected together to form one output signal.

"Static corrections" compensate for the elevation of each separate geophone location relative to an assumed datum plane, the elevation of the energy source or shot points relative to the datum plane, the velocity of seismic waves through a low velocity layer immediately adjacent the surface of the earth, etc. These lumped or combined weathering and elevation corrections will be nonvariable throughout the length of the trace but will possibly differ from trace to trace in each related group of traces.

"Dynamic" or "variable corrections" include the spread, moveout, or stepout correction which is a function of the distance of a geophone location from a shot point, and any correction that is occasioned by variation of seismic velocity with depth. The magnitude of the dynamic correction varies with time for the signals that are received by any given geophone. The primary factor in determining a dynamic correction is the amount of stepout involved. The stepout correction is always greatest at the beginning of each trace and decreases to a minimum value (which may approach zero) as the trace is played out. A different variable correction of this sort is applied to each trace depending on the positions of the receiving geophones relative to the shot point.

"Time delays" are used to correlate the several traces by accounting for appropriate static and/or dynamic corrections, i.e., as the originally recorded traces are transscribed, each individual trace has a selected time delay imposed thereon. When rerecorded, then, events on each trace will be in the same relation with respect to time so that corresponding seismic information will be in alignment. The delay which introduces the static correction is usually made on the initial portion of each trace while it is being transcribed; the dynamic correction may be introduced continuously during transcription or by a series of discrete time delays of equal or unequal length at predetermined points of time along the trace being operated upon.

"Angle of reflection" is used to refer to the angle formed by straight lines drawn from the common reflection point and extending, respectively, to the shot point and seismometer locations under consideration. The angle of reflection is greater the farther removed the detecting geophone from the shot point. Also, the angle of reflection increases (for the same shot and detection points) as bounce point approaches the surface.

"Frequency of signal" refers to the periodic function of a seismic signal with respect to time, i.e., the number of repetitions of the seismic signal per unit time (usually taken as cycles per second). Therefore, the frequency of a signal represents the number of seismic waves passing the seismometer location per second.

Referring now to FIG. 1, there is shown a schematic representation of the common reflection point technique. Numerals 10, 11, 12, and 13 represent shot point locations. Geophone positions having seismometer means are indicated by 14, 15, 16 and 17. Subsurface formations 18, 19, and 20 are depicted lying parallel to and below the surface of the earth at varying depths. Common reflection points in these subsurface beds are A, B, and C, respectively. Seismic waves generated at the shot points and reflected from the subsurface beds are represented by the "arrowed" lines.

As shown, the generated vibrations are reflected in part by subsurface beds 18, 19, and 20 at designated points A, B, and C, respectively. Geophone positions 14, 15, 16 and 17, were preselected to receive vibrations reflected from bounce points A, B, and C. Electrical lines 21, 22, 23, and 24 conduct the impinging seismic signals to transducer means 25 where the signals from each geophone position are recorded as separate traces on field record 26.

For illustrative purposes, consider that an explosive charge is detonated at shot point 10. Seismic energy will propagate in all directions. A part of this energy is reflected upwardly from subsurface bed 18, point A, to seismometer means 14. Other portions of the energy are reflected from beds 19, point B, and 20, point C, and are also received at geophone location 14. Next, assume an explosive charge is set off at shot point 11. Seismic vibrations will be received at geophone location 15 representing reflections from bounce points A, B, and C. If subsequent charges are exploded at shot points 12 and 13, reflections from bounce points A, B, and C will be recorded at geophone locations 16 and 17, respectively. Of course, additional seismic shots from locations other than 10, 11, 12, and 13 can be made and the reflections from bounce points A, B, and C recorded with approximately placed receiver means.

Since the angle of reflection of sound waves from subsurface formations equals the angle of incidence, the proper geophone location for a given shot point is determined by (1) ascertaining the angle of incidence and (2) establishing where the seismic energy of interest is incident with the surface by assuming an equal reflection angle. Thus, each shot point and corresponding geophone location should have a horizontally-spaced relation such that they are equidistant from a line normal to the formation being studied at the chosen reflection point (bounce point). The reference line for establishing the proper locations for the seismometer means relative to the selected shot points is shown by "dashed" line $\alpha$, FIG. 1. Line $\alpha$ passes through bounce points A, B, and C and is perpendicular to formations 18, 19, and 20.

It has already been mentioned that the distance between a shot point and its associated geophone location is somewhat limited in practice. For example, consider shot point 12 and coupled receiving means 16, FIG. 1. When a shot is set off at 12, vibrations will impinge on formations 18, 19, and 20. Reflections from points A, B, and C are incident upon geophone location 16. Now, considering the formations, suppose that 18 is relatively close to the surface, 19 is at an intermediate distance, and 20 is very far from the surface. Under these conditions, when the trace recorded on field record 26 has been compensated for static and dynamic corrections, the resulting trace may have rather poor quality because of frequency distortion resulting from large dynamic corrections. Therefore, the common bounce technique may fail to give an improved record because the final summation trace is comprised of traces which contain portions having drastic dynamic corrections.

Further considering FIG. 1, assume a seismic shot has been made at short point location 11. Vibrations will be reflected from points A, B, and C to receiver means 15 and recorded as a trace on field record 26. In this situation the time-delayed trace (i.e., corrected trace) will likely have much less distortion than the trace in the preceding example. This is due to the fact that the spread distance in this example is smaller with respect to the average depths of the formations and, therefore, the dynamic corrections are smaller.

From these examples, it should be apparent that the best over-all trace will be obtained when a shot is made at location 10 and the reflected vibration recorded at location 14. Here, the spread distance is very small and, therefore, only minimum corrections need be made for stepout. Accordingly, when the recorded trace is timedelayed, there will be minimum frequency distortion.

However, to practice the common reflection point method at least two separate traces must be "stacked" and, preferably, more than two traces are combined. Furthermore, these traces should represent seismic data obtained from shot points located substantial distances apart. Seismologists would like, then, to add the traces produced from shots at locations 10, 11, and 12 but this likely would offer no real advantage in our situation. Portions of the combined trace would show improvement while other portions would be rendered unreadable. The distortion would become even more enhanced if more remote traces, such as the channel recorded when a shot is exploded at 13, were used in compiling the final record.

By way of summary, then, records or traces representing reflections from a common point in each subsurface formation should be added to achieve adequate signal-to-noise ratios. It is the addition of several such traces that makes the common reflection point technique a powerful tool for seismic prospecting. However, from the above discussion, it follows that desired multiplicity generally is not realized because of the frequency distortion which results when significant amounts of dynamic correction are introduced as with increased spread length.

According to the present invention, the common reflection point technique can be used and good results obtained without regard to spread distance. Accordingly, any number of seismic shots can be used in mapping an area and useful information can be extracted from each trace. Also, the corrected traces obtained by our method can be added to form a summation trace in which all portions of the record section are reliable because our final record section does not reflect traces which have been grossly distorted by extreme rates of change in the imposed time delays.

The basic concept of our invention involves the technique of improving the addition of seismic signals reflected from a common point of a subsurface formation by selectively suppressing signals recorded on certain traces while combining others. Traces of seismic energy travelling over the most vertical path of the subsurface are corrected and used in entirety in making the stacked trace. Traces representing signals which have followed less vertical paths, after being corrected, are suppressed for lengths of time beginning with the zero time end of each trace. Traces representing signals which have travelled over still more remote routes, i.e., less vertical paths, are suppressed for still longer lengths of time prior to addition.

Suppression generally will be for a predetermined length of record time such as 0.10 second, 0.20 second, 0.30 second, etc. Generally, maximum suppression rarely exceeds 1.5 seconds and usually the time of suppression during playback is under 1.0 second. The extent of suppression always varies in accordance with the spread distance, i.e., the greater the spread distance, the greater the length of suppression.

Since the undesirable signal portion of each trace is suppressed, shot holes and receivers can be spaced at any convenient distance and any number of separate seismic shots can be made with relation to predetermined bounce points. The seismic energy generated by each energy release and reflected from the selected bounce points are detected by appropriately placed receiver means. The seismic information thus obtained is recorded as separate traces on a field record, i.e., magnetic tape or other convenient means. Static and dynamic corrections are introduced to each trace by an appropriate system of time delays. Now, according to conventional practice, all these traces would be combined together or some would be deleted and the remainder would be combined. The aspect of our invention, which involves utilizing at least some portion of each recorded trace in putting together the summation trace, is, therefore, a significant advance in the art.

Another aspect of the present invention is directed toward establishing a method which would determine when a portion of a trace should be suppressed. We have made the discovery that this depends to some degree upon the angle of reflection from the particular bounce point under consideration.

Figure 2:
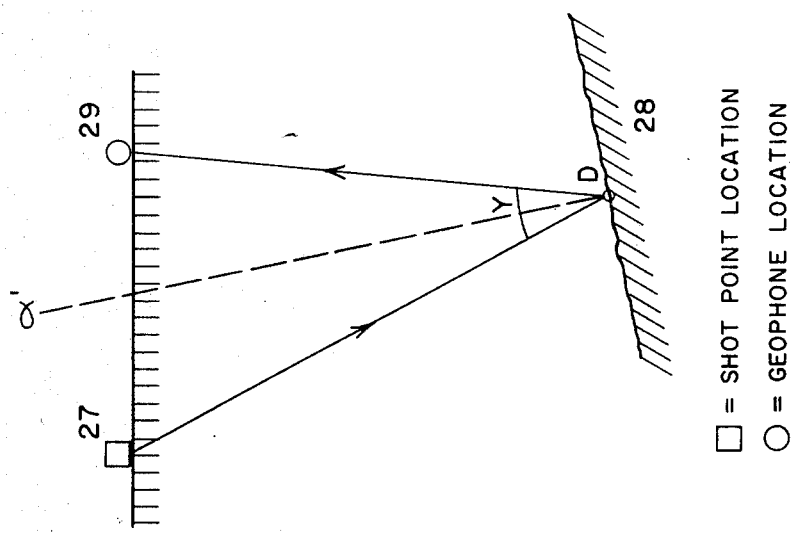
FIG. 2 illustrates the application of one aspect of our invention involving the reflection angle from a subsurface formation.

Refer now to FIG. 2, which illustrates this embodiment of our invention. Vibrations are transmitted from shot point 27 located on the surface of the earth. Bounce point D is shown on inclined subsurface bed 28. Vibrations reflected from point D are received at geophone location 29 on the surface. "Dashed" line $\alpha'$ is perpendicular to formation 28 at point D. The "arrowed" lines show the paths the wave front follows from shot point 27 to point D to receiver location 29. The angle with its apex at D and with the "arrowed" lines as sides is shown by Y. Thus, angle Y is the angle of reflection previously defined.

Now, our rule for determining when to suppress the initial portion of a trace depends on the magnitude of angle Y. If Y is larger than about 35 degrees for the particular shot location, bounce point and geophone location under consideration, then, the portion of the trace representing reflections from that bounce point should be suppressed. Where Y is an angle between about 20 and 35 degrees, the decision is optional as to whether the early portion of the trace under consideration should be suppressed or not. Usually the trace is suppressed but to a lesser extent. A trace recorded where Y is less than about 20 degrees is generally always included in the summation process.

It should be clear that for each given shot and geophone location angle Y is largest where reflections are taken from formations relatively near the surface. Energy reflected from deeper formations is associated with small values for Y. Where the reflecting formations can be considered as located at infinite depth, angle Y approaches zero. It follows, therefore, that reflections from very deep beds will likely be used in compiling the final trace whatever the spread distance on the surface. Reflections from formations close to the surface will usually be suppressed unless, of course, they were generated and received at positions relatively close together such that Y is fairly small.

Figure 3:
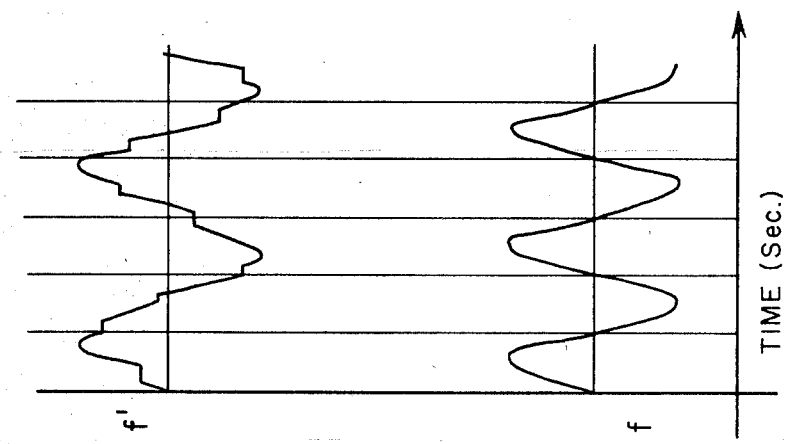
FIG. 3 is a diagrammatic representation showing the frequency differences which may be obtained between an uncorrected seismic signal and the same signal with incremental time delays.

The aforestated rule for suppression is easy to apply, however, it is not accurate for all situations. For instance, it is based on the assumption that the only dynamic corrections are stepout corrections. Also, the range of the angle is influenced by the frequency of the seismic energy, reflection coefficients, etc. FIG. 3 illustrates the much preferred method which we devised for ascertaining when a particular portion of a seismic trace should be suppressed. Our improved method takes into account both stepout corrections and corrections due to velocity changes and other considerations as well.

FIG. 3 shows curve $f$ which represents the frequency of a seismic signal on a portion of an unaltered trace and curve $f'$ which is the same seismic signal with time delays imposed thereon. It can be seen that the frequency, $f'$, of the trace as corrected is less than the frequency, $f$ of the original trace. This change (decrease) in frequency is a direct result of the imposed time delays and is proportioned to same. A similar change in fundamental frequency results even though the time delays are applied continually rather than in discrete steps.

This is the basis behind our preferred method for determining which trace segments should be suppressed. We propose that if the frequency of the seismic signal on the corrected trace is changed by as much as ten percent or more, when compared with the unaltered signal, then, that portion of the trace should be suppressed. Where the frequency drop is between 5 and 10 percent, the choice is optional or the trace is suppressed to a lesser degree. Where the percent frequency change is about 5 percent or less, trace suppression should not be used. Accordingly, by comparing visual records of the original seismic data and the corrected seismic data, one can conveniently determine whether any portion of the trace should be suppressed in preparing the final summation record of the various traces.

Now, considering FIG. 4, there is shown a block diagram of the apparatus necessary to practice the methods of our invention. Transducer means 30 converts the seismic information recorded on field record 26 which has been obtained according to the method shown in FIG. 1 into corresponding electrical signals. Transducer means 30 is capable of individually transcribing each separate trace on field record 26. The electrical signals representing each trace are passed to delay system 31 which makes appropriate static and/or dynamic corrections. Systems of this type are well known in the art. An example of the system we prefer is shown in U.S. application, Ser. No. 761,044, filed Sept. 15, 1958, now Pat. No. 3,175,182 by one of the present inventors. The corrected electrical signals are then passed to suppressor unit 32 which acts to erase designated portions of the signals by suppressing the initial portion of the signals for selected lengths of time. From suppressor 32 the corrected signals which have not been suppressed and the unsuppressed portions of the suppressed signals are passed to conventional add circuit 33. A summation signal is recorded by write means 34 as a single trace on visual record 35.

Reference is now made to FIG. 5 which shows a circuit diagram of our novel suppressor unit. Electrical signals representing a corrected trace are fed to input line 36. The input signal is amplified by triode 37 and passes via output line 38 to add circuit 33, FIG. 4. B+, FIG. 5, can be any convenient power source, e.g., +300 volts. The extent to which condenser 41 is charged depends on the voltage drop across the voltage divide consisting of rheostat 40 and resistor 47 connected in series to B+. Pointer 39 is used to vary the voltage applied to capacitor 41. When the signal being operated on is connected to input line 36, ganged switch means 42 is thrown to contacts 43 and 44. Condenser 41 then discharges to ground through resistors 45 and 46. As condenser 41 discharges, a negative bias suppresse the output from tube 37. Therefore, the charge built up on condenser 41 determines the length of signal suppression. Obviously, solid state devices can be substituted for triode 37 to achieve the same results.

While there are above disclosed but a limited number of embodiments of the system of the invention herein presented, it is possible to produce still other embodiments without departing from the invention concept herein disclosed; and it is desired, therefore, that only such limitations be imposed on the impending claims as are stated therein.

What is claimed is:

1. A process for seismic prospecting comprising
   (a) locating a series of detectors on the surface of the earth at an increasing distance from a preselected point in a subsurface formation,
   (b) generating seismic disturbances at locations such that seismic energy is reflected from said point toward each of said detectors,
   (c) recording the seismic energy received by said detectors as a plurality of seismic traces,
   (d) imposing a predetermined program of time delays on said seismic traces such that corresponding events are aligned with respect to time,
   (e) suppressing the initial portion of each of the time delayed traces for a time duration which progressively increases as the distance from each detector to said point increases, and
   (f) adding said seismic traces as modified in steps (d) and (e) to produce a summation trace.

2. A process for seimic prospecting comprising
   (a) locating a series of detectors on the surface of the earth at an increasing distance from a preselected point in a subsurface formation,
   (b) generating seismic disturbances at locations such that seismic energy is reflected from said point toward each of said detectors,
   (c) recording the seismic energy received by each of said detectors as a plurality of seismic traces,
   (d) correcting said seismic traces for moveout by applying a system of time delays,
   (e) suppressing the initial portion of each of the traces other than a first trace obtained from the detector closest to said point for a time duration which progressively increases as the distance from each detector to said point increases, and
   (f) combining said first trace and the residue portions of the suppressed traces to produce a summation trace.

3. A method of seismic surveying, the steps which comprise locating a series of detectors at spaced distances, locating a series of seismic signal sources at spaced distances, the paths from respective sources in said series to repective detectors having a common depth point at a reflective boundary, reproducing a series of signal traces each passing from one of the sources to its corresponding detector by way of said common depth point, eliminating from each trace an initial signal portion with a progressively greater time duration as the distance of the detector from said common depth point increases, and combining the signals from all said traces with eliminated portions to produce a horizontally stacked summation signal with progressively restricted stacking, whereby distortion components in shallow layers are reduced.

4. A process for seismic prospecting comprising
   (a) locating a plurality of shot points in horizontal relation along a straight line near the surface of the earth,
   (b) positioning a first detection station along an extension of said straight line in horizontally spaced relation to the closest shot point such that seismic energy produced at said first shot point will be reflected upwardly from a small subsurface area of interest intermediate to said first shot point and said first detection station,
   (c) propagating seismic energy from said first shot point and detecting the seismic energy so propagated which is reflected from said small subsurface area with a seismometer located at first detection station,
   (d) recording the seismic energy so received as a first seismic trace,
   (e) positioning additional detection stations along said extension of said straight line in horizontally spaced relation respectively to each of the remaining shot points such that seismic energy generated at each of said shot points will be reflected upwardly from said same small suburface area as before and received at each said selected detection station,
   (f) propagating energy from each of said remaining shot points and detecting the seismic energy reflected from said small subsurface area with a seismometer located at the receiving detection station,
   (g) recording the seismic energy so received at each detection station as a separate seismic trace,
   (h) operating on all the recorded traces by imposing a system of time delays such that corresponding events on said traces are in proper alignment with respect to time,
   (i) suppressing the initial portion of each of the traces other than said first trace for a time duration which is an increasing function of the distance separating their respective shot points and detector stations, and
   (j) algebraically adding said first trace and the residual portions of the suppressed traces to give a summation trace.

5. A process for combining seismic traces representing signals reflected from a common point in a subsurface formation wherein said traces are derived by using a plurality of source-to-detector spacings comprising
   (a) selecting a reference trace and aligning the other traces with respect thereto by introducing appropriate moveout corrections,
   (b) suppressing each of the corrected traces starting at the zero time end thereof for a time duration which in each instance is directly proportional to its source-to-detector spacing, and (c) adding said reference trace and the unsuppressed portions of the corrected traces to provide a summation trace.

6. A process for combining seismic traces representing signals reflected from a common point in a subsurface formation wherein said traces are derived by using a plurality of source-to-detector spacings comprising
   (a) correcting said traces for normal moveout by applying a system of time delays,
   (b) suppressing the initial portion of each of the traces with the execption of a first trace having the shortest source-to-detector spacing for a time duration which progressively increases as the source-to-detector spacing for each trace increases, and
   (c) combining said first trace and the residual portions of the traces which were suppressed to give a summation trace.

7. A method of seismic surveying, the steps which comprise locating a series of detectors at spaced distances, locating a series of seismic signal sources at spaced distances, the paths from respective sources in said series to repective detectors having a common depth point at a reflective boundary, reproducing a series of signal traces each passing from one of the sources to its corresponding detector by way of said common depth point, eliminating from a plurality of said traces an initial signal portion with a progressively greater time duration as the distance of the detector from said common depth point increases, and combining the signals from all said traces with eliminated portions, and from any desired unmodified traces, to produce a horizontally stacked summation signal.

References Cited
UNITED STATES PATENTS 2,003,780   6/1935   Born _____ 181—.5
3,217,828   11/1965  Mendenhall et al.

RODNEY D. BENNETT, Jr., Primary Examiner

M. F. HUBLER, Assistant Examiner